[54] RETRACE PULSE GENERATOR HAVING IMPROVED NOISE IMMUNITY

[75] Inventors: Michael Lee Henley, Indianapolis; Lawrence Edward Smith, Noblesville, both of Ind.

[73] Assignee: RCA Corporation, New York, N.Y.

[22] Filed: Dec. 2, 1974

[21] Appl. No.: 528,619

[52] U.S. Cl. ............................................. 315/399
[51] Int. Cl.² ......................................... H01J 29/72
[58] Field of Search ........... 315/399, 400, 401, 402, 315/403, 404, 405, 406, 407, 408, 387, 388, 371

[56] References Cited
UNITED STATES PATENTS

| | | | |
|---|---|---|---|
| 2,753,451 | 7/1956 | Cetrone | 315/407 X |
| 3,428,855 | 2/1969 | McDonald | 315/401 X |

*Primary Examiner*—Richard A. Farley
*Attorney, Agent, or Firm*—E. M. Whitacre; Paul J. Rasmussen

[57] ABSTRACT

A deflection system, utilizing a deflection generator coupled to a deflection winding to provide a current in the deflection winding having a magnitude which is a function of the elasped time after a retrace pulse and which changes substantially linearly, includes a retrace pulse generator. The retrace pulse generator utilizes a first gating circuit to provide for controllable coupling between a source of trigger pulses having a first time interval therebetween and a first monostable retrace pulse generator circuit. Fixed width retrace pulses are thereby generated in response to trigger pulses. A second monostable circuit responsive to the retrace pulses is coupled to the first gate for inhibiting the flow of pulses through the first gate for a second interval of time which is less than the first interval of time. The first monostable circuit is therefore immune to noise pulses occurring during the second interval of time. A circuit coupled to the first and second monostable circuits develops trigger pulses for triggering the monostable retrace generator when the trigger pulses produced by the first source of trigger pulses have a time interval therebetween which is at least a predetermined time interval greater than the first time interval.

3 Claims, 9 Drawing Figures

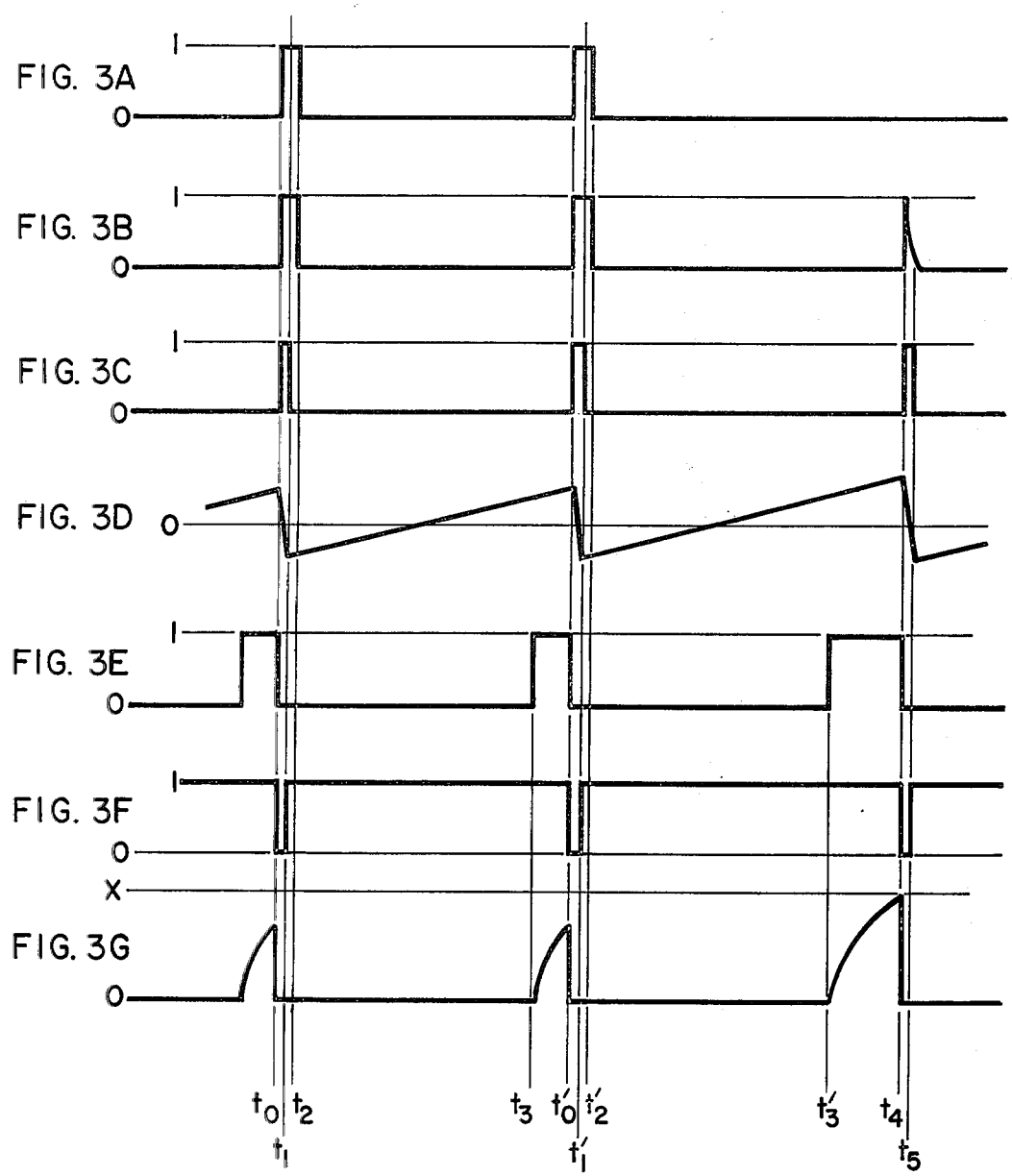

RETRACE PULSE GENERATOR HAVING IMPROVED NOISE IMMUNITY

BACKGROUND OF THE INVENTION

This invention relates to a retrace pulse generator for a deflection system.

Almost all deflection systems such as utilized in television receivers utilize a deflection current generating circuit to supply a substantially linearly changing current to a deflection winding during a trace interval. A retrace pulse, which conventionally is derived from any one of a number of types of free-running oscillators, resets the deflection generating circuit periodically to provide for periodic trace and retrace intervals. Synchronizing pulses which are recovered from the composite video signal provide for synchronization of the phase and frequency of the free-running oscillator.

Free-running oscillators of the type aforementioned generally utilize circuits wherein the probability of erroneous synchronization in response to noise pulses present in the composite video signal between synchronizing pulses is increasing and is exponentially related to the elapsed time after a first synchronizing pulse. Some improvements to the free-running oscillators of the type aforementioned have provided for distortion of the exponential relationship to enhance noise immunity. However, a system which provides for absolute noise immunity over a large portion of the interval of time between synchronizing pulses would improve system performance.

SUMMARY OF THE INVENTION

In accordance with one embodiment of the invention, a retrace pulse generator for a deflection system, including a deflection generator coupled to a deflection winding for providing a current in the deflection winding having a magnitude which is a function of the elapsed time after a retrace pulse and which changes substantially linearly, includes a first gating means. The first gating means, adapted to be coupled to a first source of trigger pulses which produces pulses having a first time interval therebetween, normally provides the trigger pulses at an output terminal in the absence of a gate disabling signal. A first monostable generator means coupled to the output terminal of the first gating means develops the retrace pulse in response to each of the trigger pulses. A second monostable generator means coupled to the first gating means and the first monostable means provides, in response to the retrace pulse, the gate disabling signal during a second time interval which is less than the first time interval. Means coupled to the first and second monostable means develop trigger pulses, thereby producing the retrace pulse, when the trigger pulses produced by the first source of trigger pulses have a time interval therebetween which is at least a predetermined time interval greater than the first time interval.

A more detailed description of a preferred embodiment of the invention is given in the following detailed description and the accompanying drawings of which:

FIGS. 3A–G illustrate normalized waveforms obtained at various points in the diagrams of FIGS. 1 and 2.

DESCRIPTION OF THE INVENTION

Figure 1:
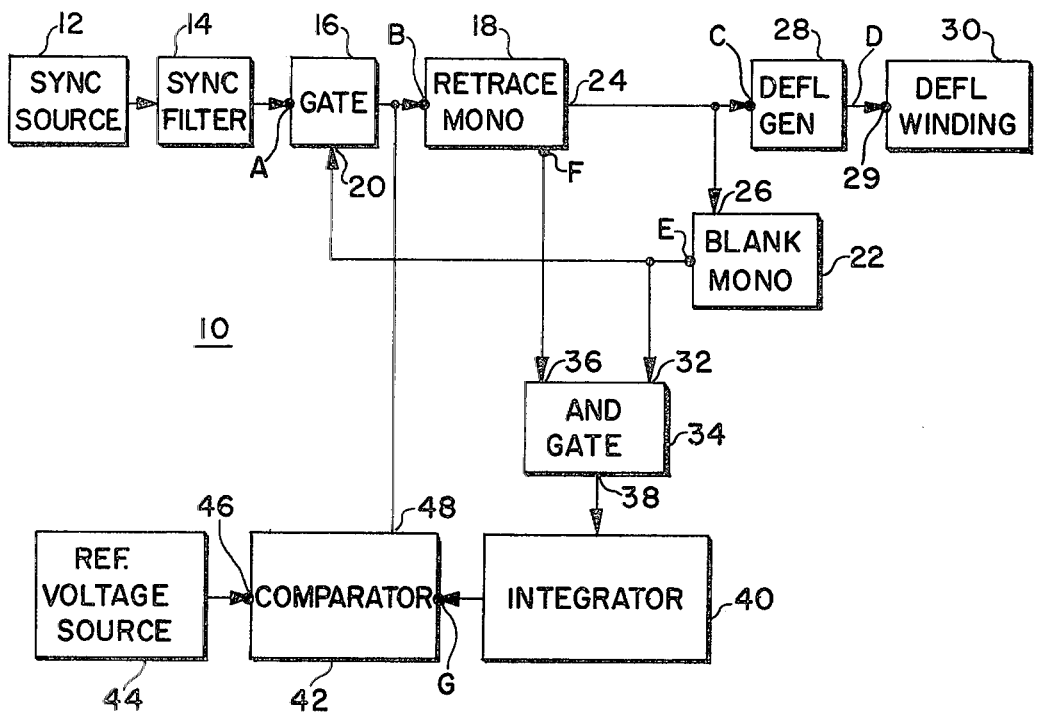
FIG. 1 is a block diagram of a deflection system embodying a retrace pulse generator according to the invention.

FIG. 1 is a block diagram of a vertical deflection system 10 embodying the invention. This system includes a synchronizing (sync) pulse source 12 which is coupled to a source of composite signals (not shown) and produces sync pulses at regular intervals of approximately 16.6 milliseconds. The output of the sync source 12 is coupled to a sync signal filter 14 which attenuates the high frequency noise associated with the sync signal produced by the sync source 12. The output of the filter 14 is coupled to an input terminal A of a gate 16. The output of gate 16 is coupled to an input terminal B of a retrace pulse monostable generator circuit 18. The sync signal appearing at the terminal B of retrace monostable circuit 18 produces a retrace pulse of uniform amplitude and duration, approximately 640 microseconds, at an output terminal 24. The output terminal 24 of retrace monostable circuit 18 is coupled to an input terminal C of a deflection generator 28. The deflection generator 28 is coupled to an input terminal 29 of a deflection winding 30 and produces a current through deflection winding 30 which provides for a substantially uniform deflection of an electron beam across the face of a kinescope (not shown) associated with deflection winding 30. Retrace of the electron beam associated with the deflection winding 30 is initiated by application of the retrace pulse from monostable circuit 18 to deflection generator 28.

Reference will now be made to the waveforms of FIGS. 3A–3F which waveforms are obtained at points A–G of FIGS. 1 and 2, and wherein a more positive voltage level is referred to as a logic 1 and a more negative voltage level, relative to the positive voltage level, is referred to as a logic 0. The leading edge of the positive retrace pulse, FIG. 3A, produced by retrace monostable 24 coupled to the input terminal 26 of blanking monostable circuit 22 produces a disabling signal, FIG. 3E, $t_0 - t_3$, having a logic 0 level, at the output terminal E of blanking monostable 22 for approximately 14.4 milliseconds. The terminal E is coupled to a terminal 32 of an AND gate 34. An output terminal F of retrace monostable circuit 18 produces a logic 0 pulse which is an inverted version of the pulse of FIG. 3A produced at the terminal 24 and is coupled to a terminal 36 of the AND gate 34. An output terminal 38 of AND gate 34 is coupled to an integrator 40. When either one or both of the terminals 32 and 36 are at a logic 0, the output terminal 38 of AND gate 34 is at a logic 0. Under all other conditions output terminal 38 is at a logic 1. The output terminal of integrator 40 is coupled to an input terminal G of a voltage comparator 42. The integrator 40 provides a logic 0 at the terminal G of voltage comparator 42 when a logic 0 exists at the output terminal 38 of AND gate 34. When a logic 1 exists at the output terminal 38 of AND gate 34, the integrator 40 provides an exponentially increasing voltage (FIG. 3G) at the terminal G of voltage comparator 42.

A reference voltage source 44 is coupled to an input terminal 46 of voltage comparator 42 and provides a uniform voltage at terminal 46 under all conditions of synchronizing signal produced by the synchronizing source 12. An output terminal 48 of the voltage comparator 42 changes from a logic 0 to a logic 1 when the exponentially increasing voltage at the terminal G exceeds the voltage of the reference voltage source 44 by a predetermined voltage. The output terminal 48 is coupled to the input terminal B of the retrace monostable circuit 18.

In operation, at $T_0$, the synchronizing source 12 produces a positive transition from logic 0 to logic 1 which is coupled via sync filter 14 to the terminal A which is shown in FIG. 3A. Assuming normal synchronizing pulse intervals, that is, positive transitions occurring approximately every 16.6 milliseconds, the terminal 20 of gate 16 is at a logic 1 at $T_0$ and the positive transition of the signal at terminal A is coupled to the terminal B. The logic 1 level at terminal B initiates the development of a retrace pulse at terminals 24, 26 and C and an inverted retrace pulse at terminals F and 36. The retrace pulse at terminal C resets the deflection generator 28 and provides for a retrace of the electron beam associated with the deflection winding 30.

The positive transition to a logic 1 of the retrace pulse at terminal 26 produces a logic 0 at terminals E, 20, and 32 thus inhibiting signal flow through the gate 16 during the period terminal E is maintained at a logic 0 by the blanking monostable circuit 22 (approximately 14.4 milliseconds). At $T_0+$ terminals 32 and 36 of AND gate 34 are both at a logic 0 and the input terminal G of voltage comparator 42 is at a logic 0.

At $T_1$, which is the end of the retrace monostable period, the output terminal 24 goes to a logic 0 independent of the synchronizing signal at terminal A because of the disabling of gate 16. The deflection generator 28 then starts to produce a substantially linearly changing current in deflection winding 30 and a corresponding linear deflection of the electron beam associated with the deflection winding 30. The output terminal F of retrace monostable circuit 18 goes to a logic 1. However, since terminal 32 of AND gate 34 remains at a logic 0, the voltage at the terminal G of voltage comparator 42 remains at a logic 0.

At $T_2$ the signal produced by the sync source 12 produces a negative transition at the terminal A of gate 16; however, since the terminal 20 is at a logic 0, the signal at terminal B is unaffected by the signal at terminal A.

At $T_3$ terminals E, 20 and 32 go to a logic 1. With terminals 32 and 36 at a logic 1 the gate 16 is enabled and the integrator 40 provides for an exponentially increasing voltage at terminal G of voltage comparator 42. Since a transition to a logic 1 of the synchronizing signal produced by the sync source 12 will normally occur prior to the point at which the voltage at terminal G will exceed the voltage at terminal 46 of voltage comparator 42, the retrace monostable circuit 18 will produce correspondingly regularly spaced retrace pulses resulting in a uniform width sawtooth waveform being generated at the terminal D.

At $T_3'$ the voltage at the terminal G of voltage comparator 42 again begins to exponentially increase as at $T_3$ aforementioned. Since no positive transition to a logic 1 is produced by the sync source 12 prior to the voltage at terminal G reaching a voltage exceeding the voltage at terminal 46 by the predetermined amount, a positive transition to a logic 1 is produced at terminal 48 of voltage comparator 42 at $T_4$. The logic 1 at terminal 48 initiates the production of a retrace pulse by retrace monostable circuit 18 and thus provides for a reset of the deflection generator 28 at $T_4$. Also, terminal 36 of AND gate 34 goes to logic 0 which returns terminals G and 48 of comparator 42 to a logic 0. Upon the termination of the retrace pulse at $T_5$ the deflection generator 28 again produces a linear deflection of the electron beam associated with the deflection winding 30.

Since the time period between $T_0'$ and $T_4$ is greater than the time period between $T_0$ and $T_0'$, the current produced by the deflection generator 28 when no signal is being produced by the sync source 12 is greater than when there is signal being produced by the sync source 12.

It can be seen that the only period during which positive transitions provided by sync source 12 will initiate a retrace pulse is during a time interval equal to the period $T_3' - T_4$. In this embodiment, this period is selected to be approximately 4.4 milliseconds as compared to the normal repetition rate of the signal produced by the sync source 12 of 16.6 milliseconds. It can be seen that under normal conditions noise occurring between sync pulses produced by the sync source 12 is decoupled from the retrace monostable circuit 18 during a period of approximately 14.4 milliseconds, thereby decreasing the period to 2.2 milliseconds per interval between sync pulses during which noise can effect the retrace pulse generation. Therefore, the probability of initiation of an undesired retrace pulse in response to noise pulses produced by the sync source 12 is greatly reduced.

Figure 2:
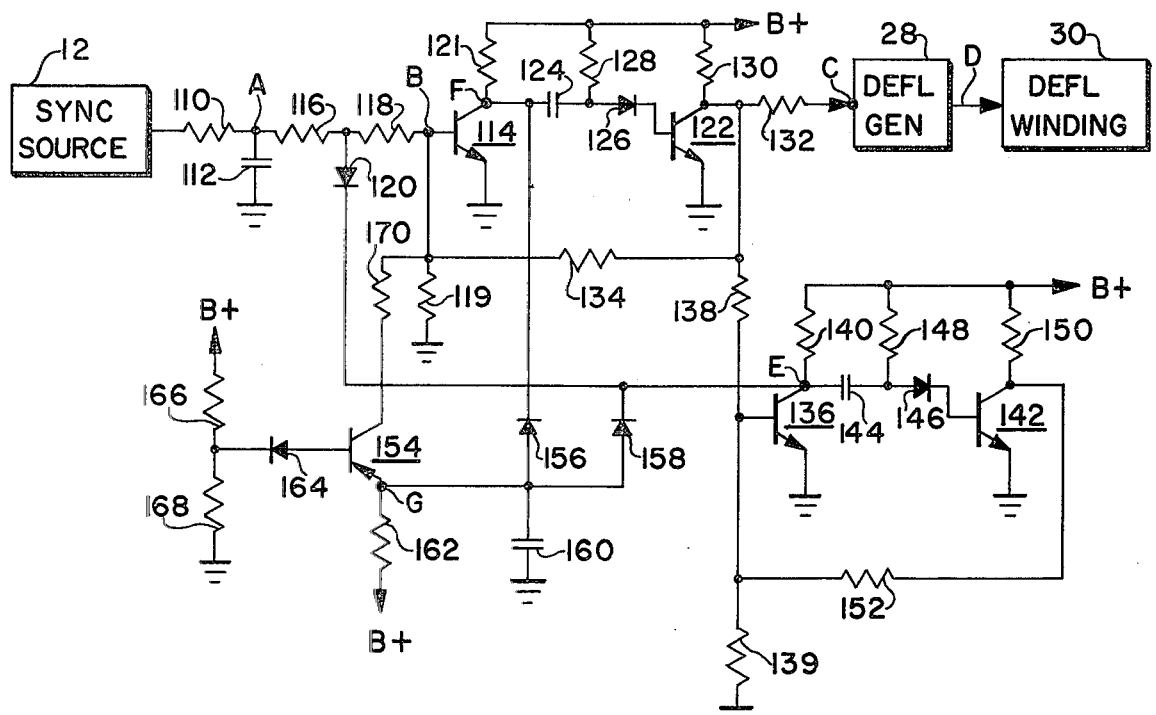
FIG. 2 is a schematic diagram, partially in block form, of the deflection system embodying the invention of FIG. 1.

FIG. 2 is a schematic diagram, partially in block form, of the deflection system of FIG. 1 embodying the invention. Blocks performing the same function as those blocks shown in FIG. 1 are numbered the same as in FIG. 1. The sync source 12, coupled as indicated in FIG. 1 to a source of composite sync signals (not shown), is coupled by a series combination of a resistor 110 and a capacitor 112 to reference potential. The junction of resistor 110 and capacitor 112, designated as terminal A, is coupled to the base electrode of a transistor 114, designated as terminal B, by means of a series combination of resistors 116 and 118. The base electrode is coupled to reference potential by means of resistor 119. The emitter electrode of transistor 114 is connected to reference potential. The collector electrode of transistor 114, designated as terminal F, is coupled to a source of operating potential (B+) by means of a resistor 121 and coupled to the base electrode of a transistor 122 by means of a series combination of a capacitor 124 and a diode 126. The junction of capacitor 124 and diode 126 is coupled to B+ by means of a resistor 128. The emitter electrode of transistor 122 is coupled to reference potential and the collector electrode is coupled to B+ by means of a resistor 130, to the input terminal C of deflection generator 28 by means of a resistor 132, to the base electrode of transistor 114 by means of a resistor 134 and to the base electrode of a transistor 136 by means of a resistor 138. A resistor 139 is coupled between the base electrode of a transistor 136 and reference potential. Transistors 114 and 122 operate in conjunction with interconnecting components to form the retrace monostable circuit referred to in FIG. 1.

The deflection generator 28 as described in conjunction with FIG. 1 provides a substantially linearly increasing current in the deflection winding 30 when a logic 0 exists at input terminal C and a reset of the deflection generator 28 when a logic 1 exists at input terminal C as described in conjunction with FIG. 1.

The emitter electrode of transistor 136 is coupled to reference potential. The collector electrode of transistor 136, designated as terminal E, is coupled by means of a resistor 140 to B+ and to the base electrode of a transistor 142 by means of a series combination of a capacitor 144 and a diode 146. The junction of the capacitor 144 and the diode 146 is coupled to B+ by means of a resistor 148. The emitter electrode of transistor 142 is coupled to reference potential. The collector electrode of transistor 142 is coupled to B+ by means of a resistor 150 and to the base electrode of the transistor 136 by means of a resistor 152. Transistors 136 and 142 operate in conjunction with interconnecting components to form a blanking monostable multivibrator circuit referred to in FIG. 1.

The collector electrode of transistor 114 is coupled to the emitter electrode of a transistor 154 by means of a diode 156. The collector electrode of transistor 136 is coupled by means of a diode 158 to the emitter electrode of transistor 154. The emitter electrode of transistor 154 is coupled to reference potential by means of an integrating capacitor 160 and coupled to B+ by means of a resistor 162. The base electrode of transistor 154 is coupled by means of a diode 164 to the junction of resistors 166 and 168 which comprises a voltage divider coupled between B+ and reference potential. The collector electrode of transistor 154 is coupled to the base electrode of transistor 114 by means of a resistor 170.

In operation, signals developed at various points A-G in the deflection system are shown in FIGS. 3A–G. Sync pulses produced by the sync source 12 are filtered by resistor 110 and capacitor 112 to reduce the high frequency content of any noise associated with the sync signal. The filtered sync signal produced at terminal A is shown in FIG. 3A. Assuming normal production of sync signals by sync source 12 over a number of intervals prior to $T_0$, the voltage at the terminal E at $T_0$ is approximately B+ (logic 1), therefore the diode 120 is reverse biased and the signal appearing at terminal A will be coupled to terminal B.

At $T_0$ the positive transistor to a logic 1 of the signal at terminal B will turn on transistor 114 and reduce the voltage at the collector electrode to approximately reference potential, logic 0. The negative transition of the voltage at the collector electrode of transistor 114 will result in a negative voltage at the anode of diode 126 and cutoff of the transistor 122. With transistor 122 in cutoff, the collector electrode of transistor 122 will increase to approximately B+ (logic 1). With a B+ voltage on the collector of transistor 122, B+ will be supplied via resistor 132 to deflection generator 28 thereby initiating a retrace interval in deflection generator 28. The retrace interval of the deflection generator 28 occurs during the interval $T_0$ to $T_1$ as shown in FIG. 3D.

With a B+ voltage on the collector of transistor 122, a voltage is fed back to the base electrode of transistor 114 via resistor 134 to sustain saturation of transistor 114 for the retrace pulse period, approximately 640 microseconds. Therefore, after the initial positive transition of the signal at terminal B, the voltage at the collector of transistor 122 is independent of the signal produced by the sync source 12.

The transition to logic 1 of the voltage at the collector of transistor 122 is coupled via the resistor 138 to the base electrode of transistor 136 and provides for saturation of the transistor 136 for the blanking monostable period, approximately 14.4 milliseconds. With transistor 136 saturated the collector electrode goes to approximately reference ptoential, logic 0, creating a negative voltage at the anode of diode 146 and cutoff of the transistor 142. With transistor 142 in cutoff the collector electrode increases to B+ voltage, which voltage is fed back to the base electrode of transistor 136 by means of a resistor 152 and provides for saturation of transistor 136 independent of the voltage at the collector of transistor 122.

During saturation of transistors 114 and 136 the capacitor 160 is clamped to approximately one volt by means of diodes 156 and 158. Also the voltage at the junction of resistors 116 and 118 is clamped by means of the diode 120 to approximately 1 volt. The clamping of the voltage at the junction of resistors 116 and 118 prevents any significant level of signal from being coupled from terminal A to terminal B during the period which transistor 136 is saturated.

At $T_1$ capacitor 124 has discharged through transistor 114, and charged in the opposite direction from B+ through resistor 128, to a positive level which provides for saturation of the transistor 122 via resistor 128 and diode 126. Saturation of transistor 122 provides for a voltage at the collector electrode of transistor 122 which is approximately reference potential, logic 0. This voltage coupled to the input terminal C of deflection generator 28 initiates the trace interval by production of a linearly increasing current in deflection winding 30. The change of voltage at the collector of transistor 122, however, has no effect on the transistors 136 and 142 since the saturation of transistor 136 is sustained by the feedback from the collector of transistor 142 to the base electrode of transistor 136 by means of resistor 152. Therefore, the voltage on capacitor 160 remains at one volt and the voltage at the junction of resistors 116 and 118 also remains clamped at one volt for the blanking monostable period.

At $T_3$ capacitor 144 has discharged through transistor 136, and charged in the opposite direction from B+ through resistor 148, to a positive level which provides for saturation of the transistor 142 via resistor 148 and diode 146. When transistor 142 is saturated, the transistor 136 is in cutoff and the collector electrode of transistor 136 goes to B+. With B+ at the collector electrode of transistor 136, diode 156 and diode 120 are reverse biased and the capacitor 160 is allowed to charge via resistor 162 to B+. Also, with diode 120 reverse biased, signals generated by the sync source 12 may be coupled to the base electrode of transistor 114. Under normal conditions of sync signal produced by the sync source 12, the charge obtained by capacitor 160 after $T_3$ is not sufficient to provide for forward biasing of the base emitter junction of the transistor 154 and the diode 164 before a positive transition is produced by synchronizing source 12.

If, however, a positive transition is not produced by the synchronizing source 12 within approximately 18.8 milliseconds after a previous positive transition, the charge on the capacitor 160 will reach a level providing for forward biasing of the base-emitter junction of the transistor 154 and the diode 164, thus, providing for saturation of the transistor 154 and the production of a positive transition at the base electrode of transistor 114 providing a retrace pulse for application to deflection generator 28 at $T_4$ and an initiation of the production of the ramp voltage at terminal D at $T_5$. Therefore, in the absence of sync pulses from the sync source 12 a sawtooth current waveshape is produced in the deflection winding 30 which has a frequency somewhat lower than the frequency existing under normal synchronizing conditions. Synchronization can, therefore, be accomplished upon reinstatement of the production of synchronizing pulses by sync source 12. The synchronized condition will occur when the sync pulses occur during the interval $t_3' - t_4$, when the base circuit of transistor 114 is enabled to receive sync pulses. Depending on the timing between the sync pulses and the enabling interval $t_3' - t_4$, several cycles of nonsynchronized operation may be necessary before synchronization occurs.

It may be noted that in addition to providing improved noise immunity the aforementioned circuit provides a uniform retrace pulse amplitude and duration and a uniform free-running frequency of the retrace pulse generator. The uniform retrace pulse and the uniform free-running frequency of the retrace pulse generator provide for synchronization of the deflection system with the pulse produced by the synchronizing source 12 without the need for a coarse frequency adjustment normally provided by a vertical hold control potentiometer associated with conventional vertical sync generators. This results in one less adjustment the television viewer has to make.

Although the preferred embodiment of the invention was described in the context of a television vertical deflection rate, appropriate changes of the monostable generator periods and component values can readily provide for operation at virtually any desired deflection rate.

What is claimed is:

1. In a deflection system including a deflection generator coupled to a deflection winding for providing a current in said deflection winding having a magnitude which is a function of the elapsed time after a retrace pulse and which changes substantially linearly, a retrace pulse generator comprising:

first gating means, adapted to be coupled to a first source of trigger pulses which produces pulses having a first time interval therebetween, for providing said trigger pulses at an output terminal in the absence of a gate disabling signal;

first monostable means coupled to said output terminal of said first gating means for developing said retrace pulse in response to each of said trigger pulses;

second monostable means coupled to said first gating means and said first monostable means for providing, in response to said retrace pulse, said gate disabling signal during a second time interval which is less than said first time interval; and means coupled to said first and second monostable means for developing second trigger pulses, thereby producing said retrace pulse, when said trigger pulses produced by said first source have a time interval therebetween which is at least a predetermined time interval greater than said first time interval.

2. A retrace pulse generator according to claim 1 wherein said means for developing trigger pulses includes:

means coupled to said first and second monostable means for developing a first signal the magnitude of which is proportional to the elapsed time after said first time interval;

a source of reference signal; and comparator means coupled to said means for developing a first signal and said source of reference signal for developing said second trigger pulse when the magnitude of said first signal exceeds said reference signal level.

3. A retrace pulse generator according to claim 2 wherein said means for developing said first signal includes:

second gating means coupled to said first and second monostable means for providing a source of charging potential after said first time interval; and integrating means coupled to said second gating means for developing said first signal when said charging potential is being developed by said second gating means.

* * * * *